US010705417B2

(12) United States Patent
Abe

(10) Patent No.: US 10,705,417 B2
(45) Date of Patent: Jul. 7, 2020

(54) WAVELENGTH CONVERSION ELEMENT, LIGHT SOURCE APPARATUS AND IMAGE PROJECTION APPARATUS

(71) Applicant: CANON KABUSHIKI KAISHA, Tokyo (JP)

(72) Inventor: Masayuki Abe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/364,934

(22) Filed: Mar. 26, 2019

(65) Prior Publication Data
US 2019/0302589 A1 Oct. 3, 2019

(30) Foreign Application Priority Data
Apr. 2, 2018 (JP) .................. 2018-070526

(51) Int. Cl.
*G03B 21/20* (2006.01)
(52) U.S. Cl.
CPC ....... *G03B 21/204* (2013.01); *G03B 21/2073* (2013.01)
(58) Field of Classification Search
CPC ................ G03B 21/145; G03B 21/204; G03B 21/2013; G03B 21/2033; G03B 21/2073; F21V 9/16; F21V 9/30
See application file for complete search history.

(56) References Cited

U.S. PATENT DOCUMENTS

| 2014/0246689 A1 | 9/2014 | Luo et al. | |
| 2017/0244939 A1* | 8/2017 | Arakawa | G03B 21/204 |
| 2019/0072243 A1* | 3/2019 | Egawa | F21V 9/40 |

FOREIGN PATENT DOCUMENTS

| JP | 2012137744 A | 7/2012 |
| JP | 2014170938 A | 9/2014 |
| JP | 2016145881 A | 8/2016 |

* cited by examiner

*Primary Examiner* — Sultan Chowdhury
(74) *Attorney, Agent, or Firm* — Carter, DeLuca & Farrell LLP

(57) ABSTRACT

The wavelength conversion element includes a quantum dot layer containing at least one of quantum dots and quantum rods, the quantum dots and rods converting a first light from a light source into a second light whose wavelength is different from that of the first light, and a fluorescent body layer containing a fluorescent body that converts the first light into a third light whose wavelength is different from that of the first light. The quantum dot layer and the fluorescent body layer are arranged in this order from a light entrance side on which the first light enters the wavelength conversion element or in reverse order. The second light and the third light exit from the quantum dot layer.

11 Claims, 5 Drawing Sheets

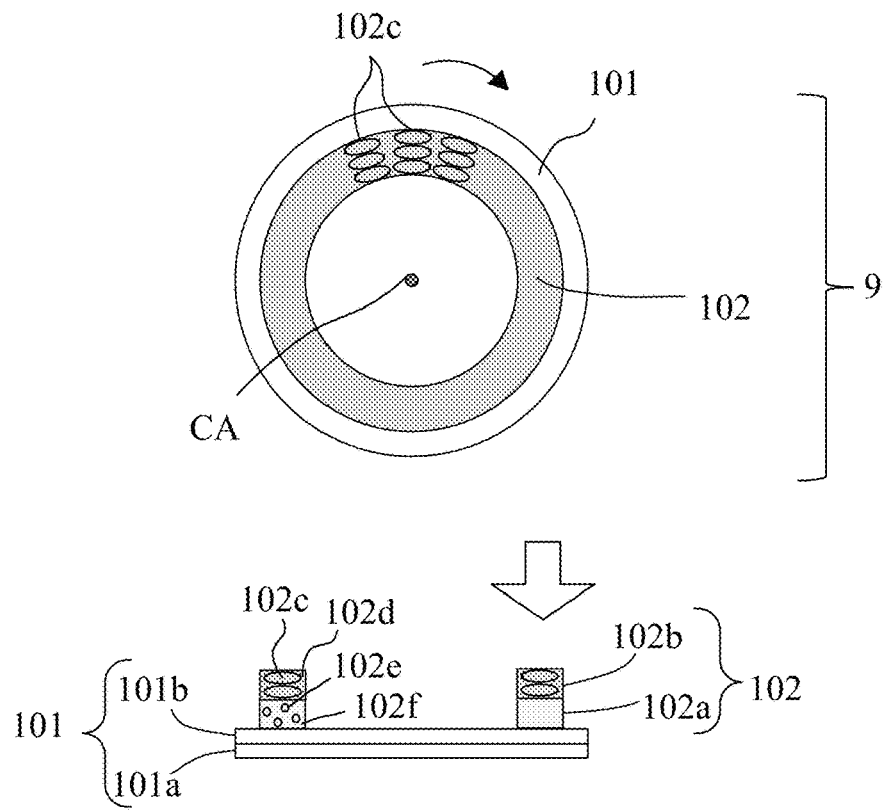
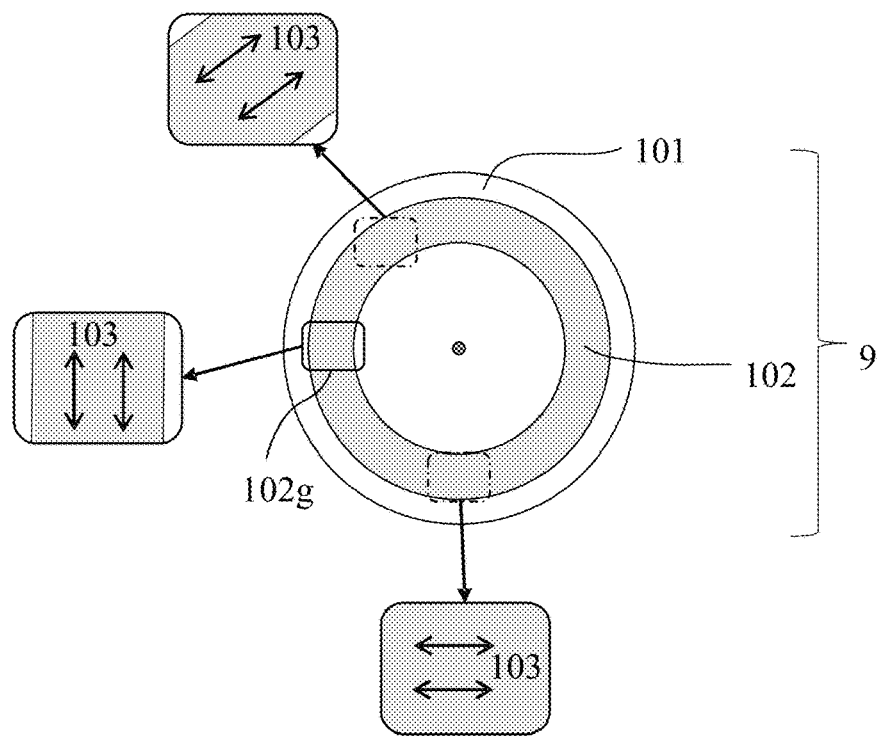
FIG. 2
FIG. 3

WAVELENGTH CONVERSION ELEMENT, LIGHT SOURCE APPARATUS AND IMAGE PROJECTION APPARATUS

BACKGROUND OF THE INVENTION

Field of the Invention

The present invention relates to a wavelength conversion element used in light source apparatuses suitable for image projection apparatuses (projectors).

Description of the Related Art

Projectors includes, as disclosed in Japanese Patent Laid-Open No. 2012-137744, one that introduces an excitation light from a light source to a fluorescent body to cause it to emit a fluorescent light (wavelength-converted light), and that uses a combined light including the fluorescent light and a non-converted light which is not converted into the fluorescent light in the excitation light to project and display an image. Japanese Patent Laid-Open No. 2016-145881 discloses a projector using quantum rods, instead of the fluorescent body, and wavelength-converts an entering light into a linearly polarized light.

However, wavelength conversion using only quantum rods as the projector disclosed in Japanese Patent Laid-Open No. 2016-145881 decreases light utilization efficiency, and thereby makes it difficult to project a bright image.

SUMMARY OF THE INVENTION

The present invention provides a wavelength conversion element, a light source and an image projection apparatus capable of improving light utilization efficiency and color purity while using quantum dots or quantum rods.

The present invention provides as an aspect thereof a wavelength conversion element including a quantum dot layer containing at least one of quantum dots and quantum rods, the quantum dots and rods converting a first light from a light source into a second light whose wavelength is different from that of the first light, and a fluorescent body layer containing a fluorescent body that converts the first light into a third light whose wavelength is different from that of the first light. The quantum dot layer and the fluorescent body layer are arranged in this order from a light entrance side on which the first light enters the wavelength conversion element or in reverse order. The second light and the third light exit from the quantum dot layer.

The present invention provides as other aspects thereof a light source apparatus and an image projection apparatus each using the above wavelength conversion element.

Further features of the present invention will become apparent from the following description of exemplary embodiments with reference to the attached drawings.

BRIEF DESCRIPTION OF THE DRAWINGS

FIG. 2 illustrates a configuration of a wavelength conversion element in Embodiment 1.

FIG. 3 illustrates a polarization direction of a light exiting from a quantum dot layer in Embodiment 1.

DESCRIPTION OF THE EMBODIMENTS

Exemplary embodiments of the present invention will hereinafter be described with reference to the accompanying drawings.

Embodiment 1

Figure 1:
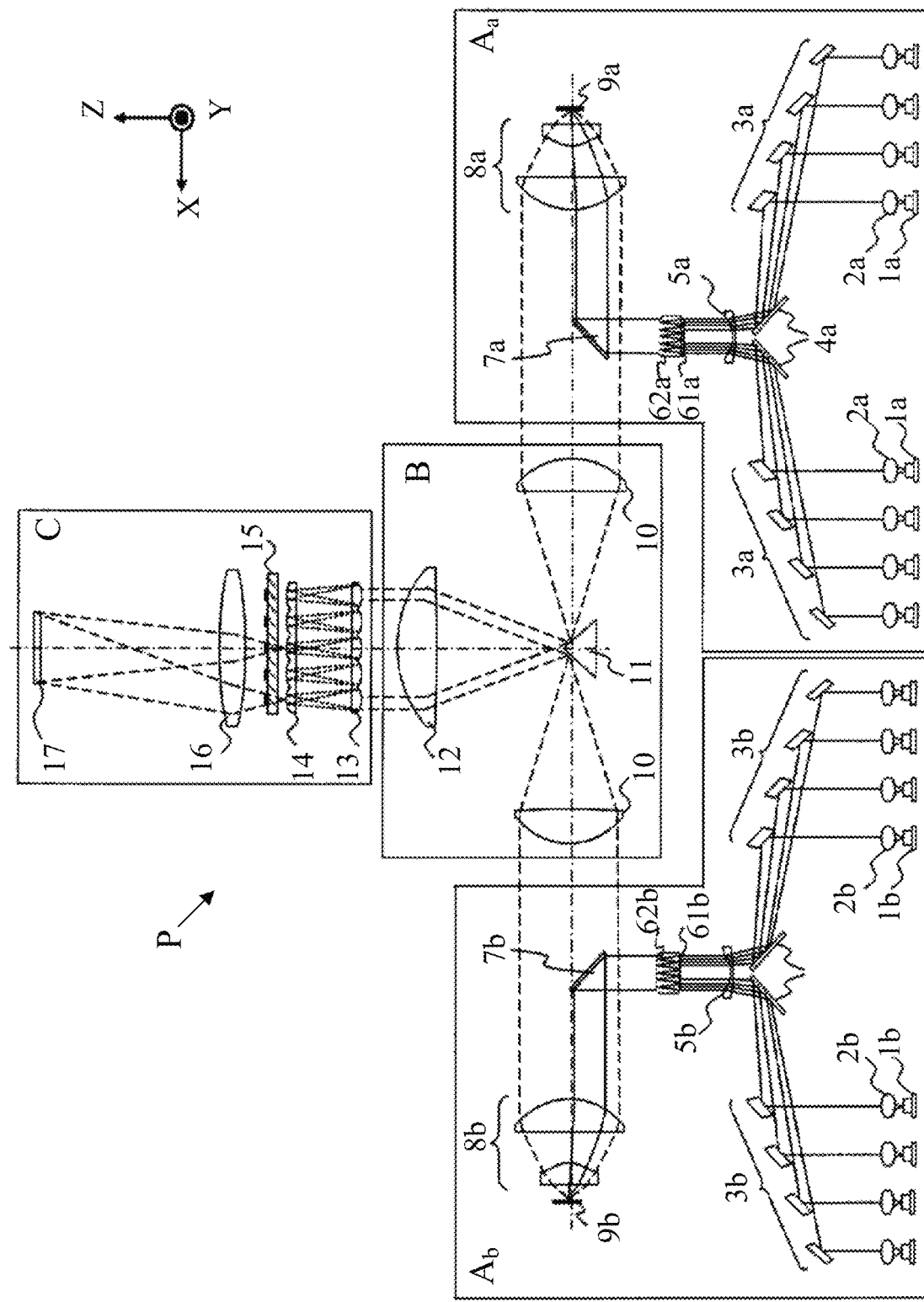
FIG. 1 illustrates a configuration of a light source apparatus in Embodiment 1 of the present invention.

FIG. 1 illustrates a configuration of a projector P as an image projection apparatus that is a first embodiment (Embodiment 1) of the present invention. The projector P includes two light source units $A_a$ and $A_b$ as light source apparatuses, an optical path combiner B, an illumination optical system C, and a projection lens (not illustrated). In FIG. 1, a direction orthogonal to a sheet of FIG. 1 is a Y direction, and a horizontal direction and a vertical direction each being orthogonal to the Y direction are an X direction and a Z direction, respectively. Constituent elements of the two light source units $A_a$ and $A_b$ are denoted in FIG. 1 by reference numerals with indices a and b for indicating which light source unit includes the constituent elements. However, the following description omits the indices a and b except when necessary.

The light source unit A includes a light source 1, a collimator lens 2, a parabolic mirror array 3, a plane mirror 4, a concave lens 5, a lens array 6, a dichroic mirror 7, a collective lens, and a wavelength conversion element 9. The light source unit A converts a wavelength-converted light exiting from the wavelength conversion element 9 into a collimated light flux by the collective lens 8. The collimated light flux exits from the light source unit A.

The collimated lights exiting from the two light source units $A_a$ and $A_b$ enter the optical path combiner B including a convex lens 10, a combination optical prism 11, and a collimation lens 12 to be combined together. The combined light enters the illumination optical system C. The illumination optical system C includes a first fly-eye lens 13, a second fly-eye lens 14, a polarization conversion element 15, a condenser lens 16, and a light modulator 17.

The light source 1 includes multiple blue laser diodes (hereinafter referred to as "blue LDs"). A light flux emitted from each blue LD is a divergent light flux. The divergent light flux is converted into a collimated light flux by the collimator lens 2 provided for each blue LD and disposed immediately after the blue LD.

The collimated light flux exiting from the collimated lens 2 proceeds in the Z direction, and then is reflected and collected by the parabolic mirror array 3. The reflected light flux from the parabolic mirror array 3 is reflected by the plane mirror 4, and then enters the concave lens 5. The concave lens 5 has a focal point common to that of the parabolic mirror array 3, so that the light flux exiting from the concave lens 5 becomes a collimated light flux. The collimated light exiting from the concave lens 5 enters the lens array 6. The lens array 6 has, as its both surfaces, a first lens array surface 61 and a second lens array surface 62. The collimated light exiting from the concave lens 5 is divided by the first lens array surface 61 into multiple light fluxes, and then passes through the second lens array surface 62 to proceed toward the dichroic mirror 7.

The dichroic mirror 7 reflects the multiple divided light fluxes toward the collective lens 8. The dichroic mirror 7 has a minimum necessary size for reflecting the multiple divided light fluxes, and its surface is coated by a dielectric multi-layer film having a characteristic that reflects a light of a blue wavelength range and transmits lights of other wavelength ranges.

The multiple divided light fluxes (blue light fluxes) are collected by the collective lens 8 to be superposed with one another on the wavelength conversion element 9, thereby forming a light source image spot thereon. The wavelength conversion element 9 is disposed at a position conjugated with lens cells of the first lens array surface 61 by the second lens array surface 62 and the collective lens 8. The light flux collimated by the concave lens 5 has a non-uniform light density distribution when reaching the first lens array surface 61. However, the light fluxes subjected to the division by the lens array 6 and the superposition by the collective lens 8 form, on the wavelength conversion element 9, a light projected area having a shape similar to that of each lens cell of the first lens array surface 61 and a uniform light density distribution. That is, the light fluxes form, on the wavelength conversion element 9, a combined image in which multiple images of the lens cells of the first lens array surface 61 as objects are superposed with one another. This configuration prevents the light flux (excitation light) from the light source 1 from being concentratedly projected to one point on the wavelength conversion element 9, thereby reducing decrease in conversion efficiency of the wavelength conversion element 9.

A part of the blue wavelength range excitation light reaching the wavelength conversion element 9 is converted into a wavelength-converted light of red and green wavelength ranges and reflected, and a remaining part of the blue wavelength range excitation light is reflected without being wavelength-converted. The red wavelength range light (red light), the green wavelength range light (green light) and the blue wavelength range light (blue light) from the wavelength conversion element 9 form a white light. The white light is again collimated by the collective lens 8, and proceeds toward the illumination optical system C. A part of the white light hits the dichroic mirror 7. However, the dichroic mirror 7 has a significantly small area with respect to a sectional area of the white light, so that an amount of a reflected blue light component of the white light is small, and thereby color of the white light is little influenced by the dichroic mirror 7.

A light flux as the white light exiting from the wavelength conversion element 9 is collimated by the collective lens 8, and then enters the optical path combiner B. In the optical path combiner B, each of the collimated lights from the two light source units $A_a$ and $A_b$ enters the convex lens 10 to be condensed in a vicinity of an apex of the combination prism 11. The vicinity of the apex of the combination prism 11 is located at a position conjugated with the wavelength conversion element 9 by the collective lens 8 and the convex lens 10. Thus, in the vicinity of the apex of the combination prism 11, a light source image having a similar shape to that of a light emitting spot (that is, a light source) on the wavelength conversion element 9. The light source images formed by the light fluxes from the two light source units $A_a$ and $A_b$ are close to each other in the vicinity of the apex of the combination prism 11 to form an approximately one light source image. The light fluxes reflected by reflecting surfaces of the combination prism 11 are collimated by the collimation lens 12, and enter the illumination optical system C as one light flux. In the illumination optical system C, the light flux enters the first fly-eye lens 13 to be divided into multiple light fluxes. The divided light fluxes form light source images near the second fly-eye lens 14. The second fly-eye lens 14 is disposed at a position conjugated with the vicinity of the apex of the combination prism 11 in the optical path combiner B by the collimation lens 12 and the first fly-eye lens 13. Thus, the light source images formed near the second fly-eye lens 14 each have a similar shape to that of the approximately one light source image formed in the vicinity of the apex of the combination prism 11.

The above-described conjugate relations make the position of the second fly-eye lens 14 conjugate also with the wavelength conversion element 9 and the first lens array surface 61 via the vicinity of the apex of the combination prism 11. Therefore, the shape of each light source image formed near the second fly-eye lens 14 is similar to that of each lens cell of the first lens array surface 61.

The divided light fluxes exiting from the second fly-eye lens 14 are condensed by the condenser lens 16 to be superposed with one another on the light modulator 17. The light modulator 17 in this embodiment is a liquid crystal panel having an aspect of 16:9. The liquid crystal panel controls, at its each of pixels, a polarization state of an entering light, that is, modulates the entering light to generate a modulated light. The liquid crystal panel driven depending on a video signal input to the projector P generates an image light as the modulated light. The image light is projected by the projection lens (not illustrated) onto a projection surface such as a screen. Thereby, a projected image is displayed.

The light emitted from the light source unit A includes a non-polarized light as described below. Thus, in order to increase light use efficiency, a polarization conversion element 15 is disposed immediately after the second fly-eye lens 14. The polarization conversion element 15 is constituted by multiple thin polarization beam splitters each having a width of approximately half of each lens cell of the second fly-eye lens 14, and half-wave plates disposed on exit surfaces of alternate ones of the polarization beam splitters. The non-polarized light entering the polarization conversion element 15 is separated into a P-polarized light that is reflected by the polarization beam splitter and an S-polarized light that is transmitted through the polarization beam splitter. The P-polarized light reflected by the polarization beam splitter is reflected by another adjacent polarization beam splitter, and then is converted into an S-polarized light by the half-wave plate. The non-polarized light is thus converted into the S-polarized light. The polarization conversion element 15 may convert the non-polarized light into a P-polarized light.

FIG. 2 illustrates a detailed structure of the wavelength conversion element 9. FIG. 2 illustrates in its upper part the wavelength conversion element 9 viewed from a light entrance side from which the light from the light source 1 enters, and in its lower part a side section of the wavelength conversion element 9. In the lower part, the light entering the wavelength conversion element 9 is shown by an arrow.

The wavelength conversion element 9 in this embodiment is a reflective wavelength conversion element from which a wavelength-converted light exits to the light entrance side. The wavelength conversion element 9 is rotationally driven about its center axis CA by a motor (not illustrated).

The wavelength conversion element 9 is constituted by a circular disc-shaped rotatable substrate 101 and a ring-shaped wavelength conversion layer 102 provided on the rotatable substrate 101. The wavelength conversion layer 102 is disposed on the light entrance side further than the rotatable substrate 101. The rotatable substrate 101 includes, in order from the light entrance side, an enhanced reflection film 101b, and a reflective substrate 101a. That is, the rotatable substrate 101 has light reflectivity.

The wavelength conversion layer 102 includes, in order from the light entrance side, a quantum dot layer 102b, and a fluorescent body layer 102a. The quantum dot layer 102b is formed by multiple quantum rods 102c, and a binder 102d holding the quantum rods 102c. Each quantum rod 102c converts a blue light (first wavelength light) reaching thereto into a red light (second wavelength light), and generates a linearly polarized light whose polarization direction is parallel to a longitudinal direction (molecule direction) of the quantum rod 102c. The fluorescent body layer 102a is formed by multiple fluorescent bodies 102e, and a binder 102f holding the fluorescent bodies 102e. Each fluorescent body 102e converts the blue light (first wavelength light) reaching thereto into a fluorescent light (third wavelength light) including green and red lights. The fluorescent light generated from the fluorescent body 102e is a non-polarized light.

FIG. 3 illustrates a polarization direction 103 of the red light (linearly polarized light) exiting from the fluorescent body layer 102a. In this embodiment, the excitation light from the light source 1 reaches a light projected area 102g that is a partial area of the quantum dot layer 102b rotated with the rotatable substrate 101; the partial area is a fixed area in a rotation direction of the quantum dot layer 102b. In the quantum dot layer 102b, the quantum rods 102c are arranged such that the red light generated by wavelength conversion by the quantum rods 102c in the light projected area 102g and exiting therefrom becomes, regardless of the rotation of the quantum dot layer 102b, a linearly polarized light whose polarization direction 103 is fixed (constant).

Specifically, in the quantum dot layer 102b, the quantum rods 102c are arranged such that the longitudinal directions thereof extend in a circumferential direction of the quantum dot layer 102b. In other words, the quantum rods 102c are arranged such that their longitudinal directions are orthogonal to a radial direction of the quantum dot layer 102b. With this arrangement of the quantum rods 102c, the red light exiting from the light projected area 102g of the quantum dot layer 102b becomes a linearly polarized light whose polarization direction 103 is, regardless of the rotation of the quantum dot layer 102b, equal to the longitudinal directions of the quantum rods 102c.

It is not necessarily necessary that the red linearly polarized light exiting from the light projected area 102g is wholly formed by linearly polarized lights having mutually the same polarization directions. It is only necessary that 70 percent (desirably 80 percent) of the red linearly polarized light be formed by the linearly polarized lights having mutually the same polarization directions. In other words, it is not necessary that the longitudinal directions of the whole quantum rods 105c in the light projected area 105g are mutually the same directions, and the longitudinal directions may be slightly varied. It is desirable that the excitation light reaching the quantum rods 102c from the light source 1 be a linearly polarized light whose polarization direction is parallel to the longitudinal directions of the quantum rods 102c. This applies to the following embodiments.

Figure 4:
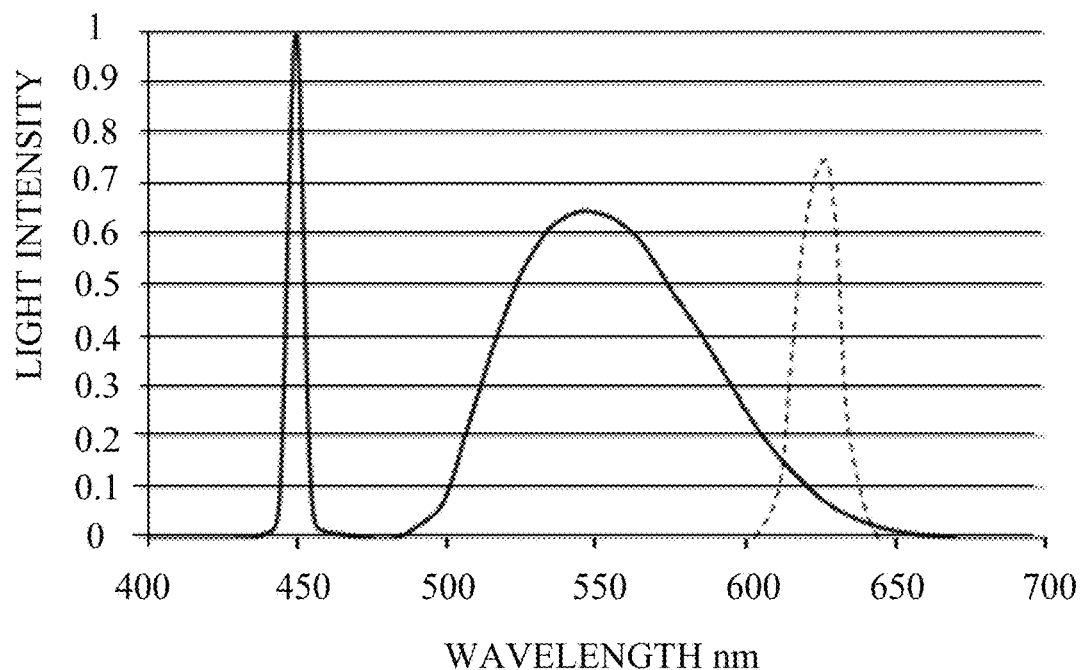
FIG. 4 illustrates spectra of a light source in Embodiment 1.

FIG. 4 illustrates spectra of the lights exiting from the wavelength conversion element 9. The excitation light from the light source 1 reaches the wavelength conversion element 9 via transmissions and reflections at the above-described various optical elements. From the wavelength conversion element 9, the fluorescent light as the third light that is illustrated by a solid line and whose wavelength range is from approximately 500 to 650 nm exits. The fluorescent light includes the green and red lights generated by the fluorescent bodies 102e wavelength-converting a part of the blue light (excitation light) as the first light from the light source 1. Moreover, from the wavelength conversion element 9, the red light as the second light that is illustrated by a broken line and whose wavelength range is from approximately 600 to 650 nm exits. The red light is generated by the quantum rods 102c wavelength-converting another part of the excitation light. Furthermore, from the wavelength conversion element 9, the blue light as a non-converted light of the excitation light reflected by the rotatable substrate 101 exits without being wavelength-converted by the quantum rods 102c and the fluorescent bodies 102e. The blue light is illustrated by the solid line and whose wavelength is approximately 450 nm. That is, the first, second and third lights exit from the wavelength conversion element 9.

The fluorescent light has its peak intensity at a wavelength of 550 nm in the green wavelength range, and the red light from the quantum rods 102c has its peak intensity at a wavelength of approximately 625 nm. The peak intensity of the red light from the quantum rods 102c is equal to or higher than that of the fluorescent light. Thus, the red light from the quantum rods 102c can compensate for the red light whose intensity is low in the fluorescent light, which enables improving color purity of the red light, and thereby enables reducing a bluish component of the white light to improve color balance of the white light.

This embodiment has a feature in the arrangement order of the quantum dot layer 102b and the fluorescent body layer 102a from the light entrance side. Although the fluorescent light exiting from the fluorescent body layer 102a is the non-polarized light, the linearly polarized light exits from the quantum dot layer 102b. This is because the polarization state of the excitation light from the light source 1 is kept before and after the wavelength conversion by the quantum rods 102c. Therefore, in order to keep the polarization state of the light exiting from the quantum dot layer 102b, it is necessary that, with respect to the excitation light entering the wavelength conversion element 9 (wavelength conversion layer 102), the quantum dot layer 102b be disposed before the fluorescent body layer 102a. If the quantum dot layer 102b is disposed after the fluorescent body layer 102a with respect to the excitation light, the polarization state of the light exiting from the quantum dot layer 102b is disturbed when the light passes through the fluorescent body layer 102a.

In this embodiment, since the red light exits from the quantum dot layer 102b, as compared with a case of providing only the fluorescent body layer 102a, the color balance of the white light can be improved. Moreover, in this embodiment, since the red light exiting from the quantum dot layer 102b is a linearly polarized light, as compared with a case where the red light is a non-polarized light, an optical element that converts the red light into a linearly polarized light after the quantum dot layer 102b can be eliminated, and light use efficiency in the subsequent optical system can be increased, which makes it possible to project a brighter image.

Embodiment 2

Figure 5:
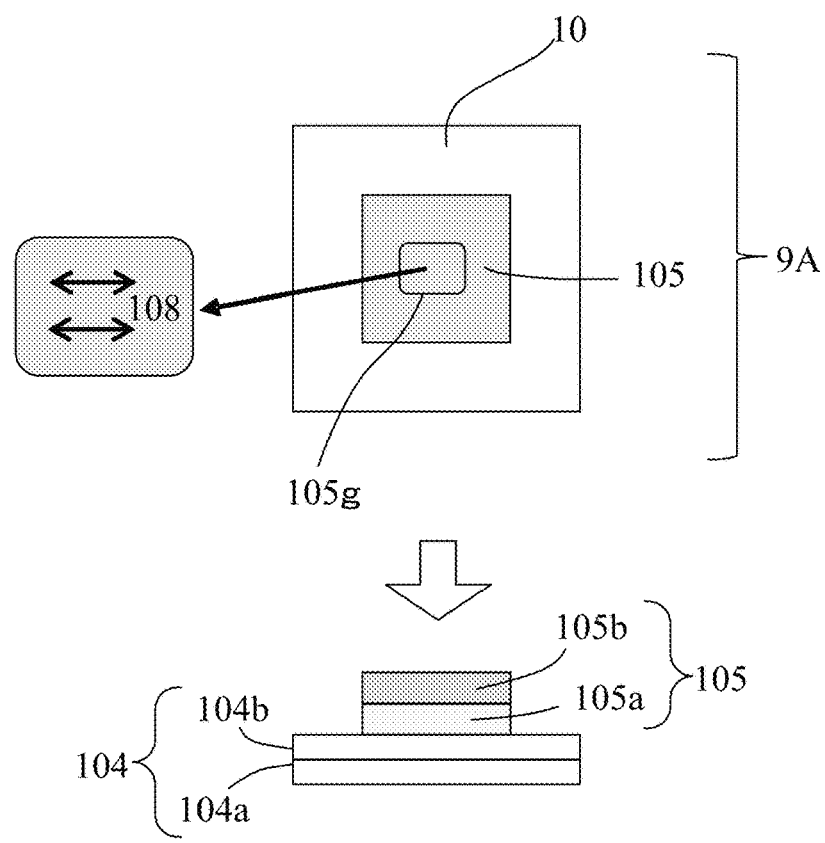
FIG. 5 illustrates a configuration of a light source apparatus and a polarization direction of a light exiting from a quantum dot layer in Embodiment 2 of the present invention.

Description will be made of a second embodiment (Embodiment 2) of the present invention. FIG. 5 illustrates a detailed structure of a reflective wavelength conversion element 9A in this embodiment. FIG. 5 illustrates in its upper part the wavelength conversion element 9A viewed from a light entrance side, and in its lower part a side section of the wavelength conversion element 9A. In this embodiment, constituent elements identical to those in Embodiment 1 are denoted by the same reference numerals as those in Embodiment 1.

The wavelength conversion element 9A is constituted by a fixed substrate 104, and a wavelength conversion layer 105. The wavelength conversion element 9A is different from the wavelength conversion element 9 in Embodiment 1 in that it is fixed without being rotated. The wavelength conversion layer 105 is disposed on the light entrance side further than the fixed substrate 104. The fixed substrate 104 includes, in order from the light entrance side, an enhanced reflection film 104b, and a reflective substrate 104a. The wavelength conversion layer 105 includes, in order from the light entrance side, a quantum dot layer 105b, and a fluorescent body layer 105a.

FIG. 5 illustrates a polarization direction 108 of a red light (linearly polarized light) exiting from the quantum dot layer 105b. In this embodiment, an excitation light from a light source 1 reaches a light projected area 105g of the quantum dot layer 105b. In the quantum dot layer 105b, quantum rods (not illustrated) are arranged such that a red light generated by wavelength conversion by the quantum rods in the light projected area 105g and exiting therefrom becomes a linearly polarized light whose polarization direction 108 is fixed. Specifically, in the quantum dot layer 105b, the quantum rods are arranged such that their longitudinal directions extend in a horizontal direction. With this arrangement of the quantum rods, the red light exiting from the light projected area 105g becomes a linearly polarized light whose polarization 108 is equal to the longitudinal directions of the quantum rods.

In this embodiment, since the red light exits from the quantum dot layer 105b, as compared with a case of providing only the fluorescent body layer 105a, color balance of a white light exiting from the wavelength conversion element 9A can be improved. Moreover, also in this embodiment, since the red light exiting from the quantum dot layer 105b is a linearly polarized light, as compared with a case where the red light is a non-polarized light, an optical element that converts the red light into a linearly polarized light after the quantum dot layer 105b can be eliminated, and light use efficiency in the subsequent optical system can be increased, which makes it possible to project a brighter image.

Embodiment 3

Figure 6:
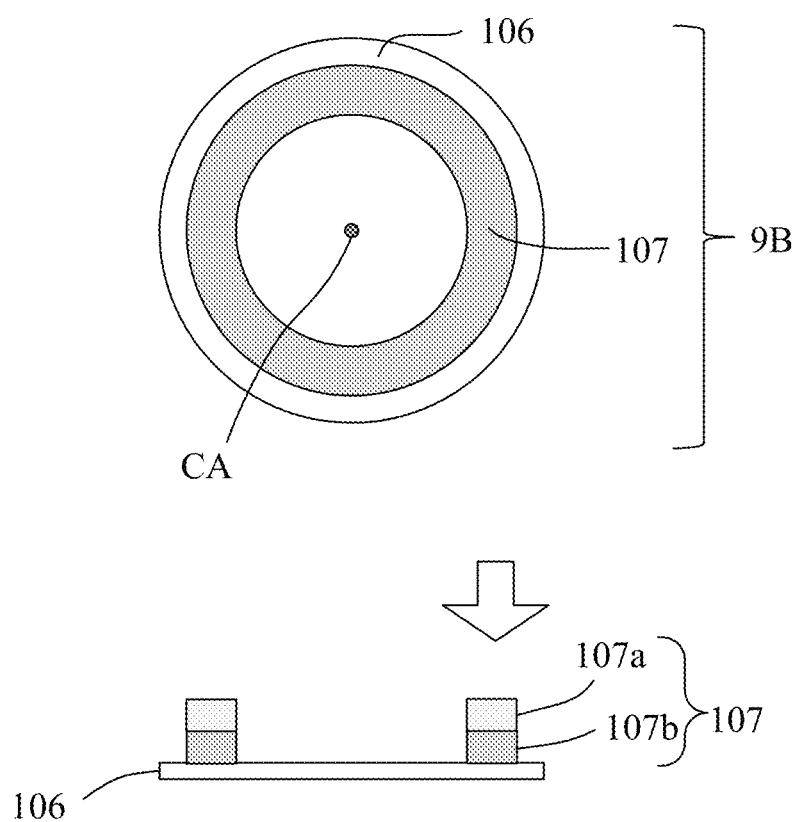
FIG. 6 illustrates a configuration of a wavelength conversion element in Embodiment 3 of the present invention.

Description will be made of a third embodiment (Embodiment 3) of the present invention. FIG. 6 illustrates a detailed structure of a wavelength conversion element 9B in this embodiment. FIG. 6 illustrates in its upper part the wavelength conversion element 9B viewed from a light entrance side, and in its lower part a side section of the wavelength conversion element 9B. In this embodiment, constituent elements identical to those in Embodiment 1 are denoted by the same reference numerals as those in Embodiment 1.

The wavelength conversion element 9B in this embodiment is a transmissive wavelength conversion element from which a wavelength-converted light exits to an opposite side to the light entrance side. The wavelength conversion element 9B is, as in Embodiment 1, rotationally driven about its center axis CA by a motor (not illustrated).

The wavelength conversion element 9B is constituted by a circular disc-shaped rotatable substrate 106, and a ring-shaped wavelength conversion layer 107 provided on the rotatable substrate 106. The wavelength conversion layer 107 is disposed on the light entrance side further than the rotatable substrate 106. The rotatable substrate 106 is made of a light transmissive material such as glass. The wavelength conversion layer 107 includes, in order from the light entrance side, a fluorescent body layer 107a and a quantum dot layer 107b.

Figure 7:
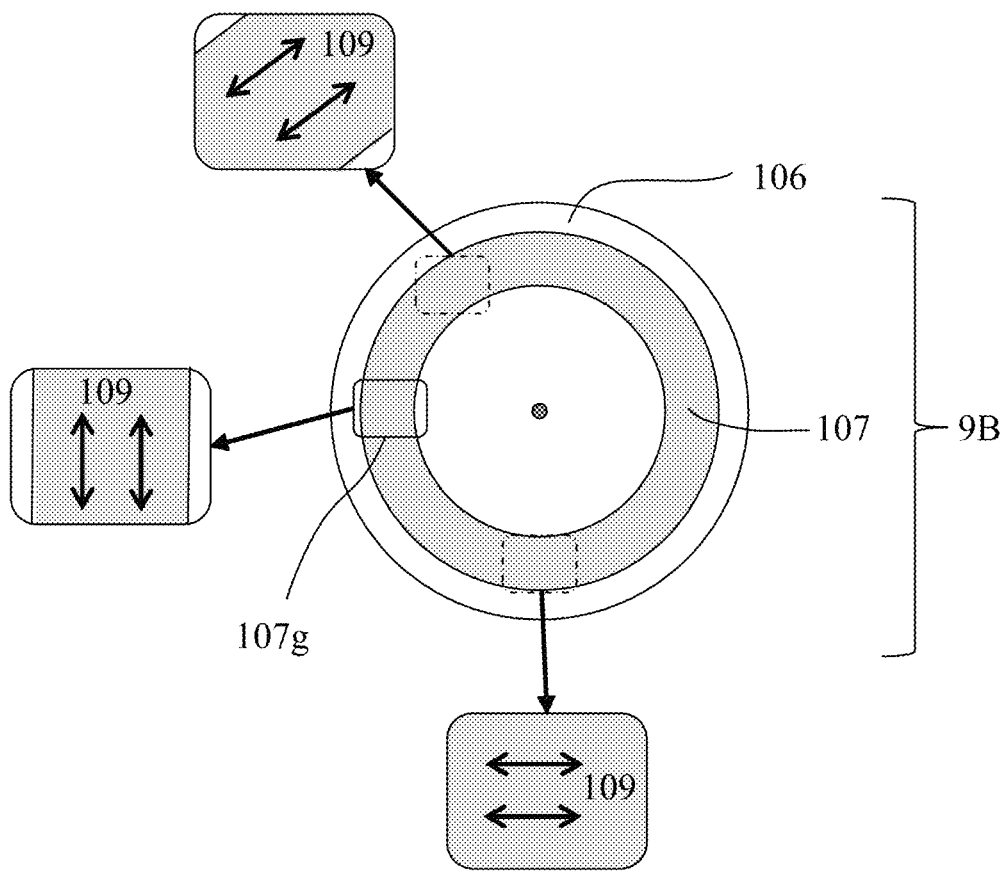
FIG. 7 illustrates a polarization direction of a light exiting from a quantum dot layer in Embodiment 3.

FIG. 7 illustrates a polarization direction 109 of a red light (linearly polarized light) exiting from the quantum dot layer 107b. In this embodiment, an excitation light from a light source 1 reaches a light projected area 107g that is a partial area of the fluorescent body layer 107a rotated with the rotatable substrate 106; the partial area is a fixed area in a rotation direction of the fluorescent body layer 107a. In the quantum dot layer 107b, quantum rods (not illustrated) are arranged such that the red light generated by wavelength conversion by the quantum rods in the light projected area 107g and exiting the quantum dot layer 107b from its back surface becomes, regardless of the rotation of the quantum dot layer 107b, a linearly polarized light whose polarization direction 109 is fixed (constant). Specifically, the quantum rods are in the same arrangement as that in Embodiment 1 (FIG. 3). With this arrangement of the quantum rods, the red light exiting from the light projected area 107g of the quantum dot layer 107b becomes a linearly polarized light whose polarization direction 109 is, regardless of the rotation of the quantum dot layer 107b, equal to longitudinal directions of the quantum rods.

From the wavelength conversion element 9B, a fluorescent light as a third light whose wavelength range is from approximately 500 to 650 nm exits. The fluorescent light includes green and red lights generated by fluorescent bodies (not illustrated) wavelength-converting a part of a blue light (excitation light) as a first light from the light source 1. Moreover, from the wavelength conversion element 9B, a red light as a second light whose wavelength range is from approximately 600 to 650 nm exits. The red light is generated by the quantum rods included in the quantum dot layer 107b and wavelength-converting another part of the excitation light. Furthermore, from the wavelength conversion element 9B, a blue light (whose wavelength is approximately 450 nm) as a non-converted light of the excitation light exits therethrough without being wavelength-converted by the fluorescent bodies and the quantum rods. That is, the first, second and third lights exit from the wavelength conversion element 9B.

This embodiment has a feature in the arrangement order of the fluorescent body layer 107a and the quantum dot layer 107b from the light entrance side. As described in Embodiment 1, although the fluorescent light exiting from the fluorescent body layer 107a is the non-polarized light, the linearly polarized light exits from the quantum dot layer 107b. Therefore, in order to keep a polarization state of the light exiting from the quantum dot layer 107b, it is necessary that, with respect to the excitation light entering the wavelength conversion element 9B (wavelength conversion layer 107), the quantum dot layer 107b be disposed after the fluorescent body layer 107a. If the quantum dot layer 107b is disposed before the fluorescent body layer 107a with respect to the excitation light, the polarization state of the light exiting from the quantum dot layer 107b is disturbed when the light passes through the fluorescent body layer 107a.

In this embodiment, since the red light exits from the quantum dot layer 107b, as compared with a case of providing only the fluorescent body layer 107a, color balance of a white light exiting from the wavelength conversion element 9B can be improved. Moreover, since the red light exiting from the quantum dot layer 107b is a linearly polarized light, as compared with a case where the red light is a non-polarized light, an optical element that converts the red light into a linearly polarized light after the quantum dot layer 105b can be eliminated, and light use efficiency in the subsequent optical system can be increased, which makes it possible to project a brighter image.

Figure 8A:
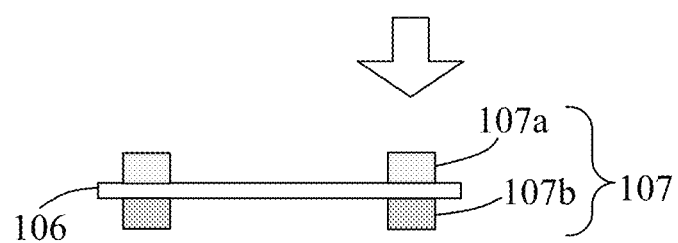
FIGS. 8A and 8B illustrate configurations of wavelength conversion elements as modified examples of Embodiment 3.
Figure 8B:
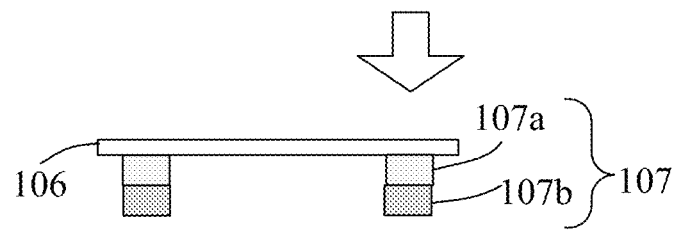

This embodiment described the transmissive wavelength conversion element 9B in which, in order from the light entrance side, the fluorescent body layer 107a, the quantum dot layer 107b and the substrate 106 are arranged. Other transmissive wavelength conversion elements may be constituted as illustrated in FIGS. 8A and 8B. In the transmissive wavelength conversion element of FIG. 8A, in order from the light entrance side, the fluorescent body layer 107a, the substrate 106 and the quantum dot layer 107b are arranged. In the transmissive wavelength conversion element of FIG. 8B, in order from the light entrance side, the substrate 106, the fluorescent body layer 107a and the quantum dot layer 107b are arranged. As just described, it is only necessary for the transmissive wavelength conversion element that the fluorescent body layer 107a be disposed on the light entrance side further than the quantum dot layer 107b.

Embodiment 4

Although Embodiments 1 to 3 described the case of using, as the light source, the blue LD that emits the blue wavelength range light, an LD is used as a light source that emits an ultraviolet wavelength range light. In this case, the quantum dot layer may include quantum rods converting the ultraviolet wavelength range light into any one of red, green and blue wavelength range lights, and may include multiple types of quantum rods respectively converting the ultraviolet wavelength range light into red, green and blue wavelength range lights. The arrangement order of the quantum dot layer and the fluorescent body layer is the same as those described in Embodiments 1 to 3.

Moreover, Embodiments 1 to 3 described the case of constituting the quantum dot layer by using the quantum rods and thereby causing the linearly polarized light to exit from the quantum dot layer. However, the light exiting from the quantum dot layer may be a non-polarized light. In this case, the quantum dot layer may be constituted by using quantum dots.

Each of the above-described embodiments including the quantum dot layer in addition to the fluorescent body layer enables improving light use efficiency and color purity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-070526, filed on Apr. 2, 2018, which is hereby incorporated by reference herein in its entirety.

What is claimed is:

1. A wavelength conversion element comprising:
a quantum dot layer containing at least one of quantum dots and quantum rods, the quantum dots and rods converting a first light from a light source into a second light whose wavelength is different from that of the first light; and
a fluorescent body layer containing a fluorescent body that converts the first light into a third light whose wavelength is different from that of the first light,
wherein:
the quantum dot layer and the fluorescent body layer are arranged in this order from a light entrance side on which the first light enters the wavelength conversion element or in reverse order; and
the second light and the third light exit from the quantum dot layer.

2. The wavelength conversion element according to claim 1, wherein:
the quantum dot layer contains at least the quantum rods; and
in the quantum dot layer, the quantum rods are arranged such that the second light exiting from the quantum dot layer becomes a linearly polarized light.

3. The wavelength conversion element according to claim 2, wherein:
the first light enters a partial area of the quantum dot layer that is rotated, the partial area being a fixed area in a rotation direction of the quantum dot layer; and
in the quantum dot layer, the quantum rods are arranged such that the second light exiting from the partial area becomes, regardless of the rotation of the quantum dot layer, a linearly polarized light having a fixed polarization direction.

4. The wavelength conversion element according to claim 1, wherein the first light is a linearly polarized light.

5. The wavelength conversion element according to claim 1, wherein:
a wavelength range of the second light is a part of that of the third light; and
a peak intensity of the second light is higher than that of the third light.

6. The wavelength conversion element according to claim 1, wherein:
a wavelength range of the third light is a green wavelength range and a red wavelength range; and
a wavelength range of the second light is the red wavelength range.

7. The wavelength conversion element according to claim 1, wherein:
the wavelength conversion element is a reflective wavelength conversion element from which the second and third lights exit to the light entrance side; and
the quantum dot layer and the fluorescent body layer are arranged in this order from the light entrance side.

8. The wavelength conversion element according to claim 1, wherein:
the wavelength conversion element is a transmissive wavelength element from which the second and third lights exit to an opposite side to the light entrance side; and
the fluorescent body layer and the quantum dot layer are arranged in this order from the light entrance side.

9. A light source apparatus comprising:
a light source; and
a wavelength conversion element,
wherein the wavelength conversion element includes:
a quantum dot layer containing at least one of quantum dots and quantum rods, the quantum dots and rods converting a first light from the light source into a second light whose wavelength is different from that of the first light; and
a fluorescent body layer containing a fluorescent body that converts the first light into a third light whose wavelength is different from that of the first light, and
wherein:
the quantum dot layer and the fluorescent body layer are arranged in this order from a light entrance side on which the first light enters the wavelength conversion element or in reverse order; and
the second light and the third light exit from the quantum dot layer.

10. The light source apparatus according to claim 9, further comprising:
a polarization conversion element converting the third light that is a non-polarized light into a linearly polarized light.

11. An image projection apparatus comprising:
a light source apparatus; and
a light modulator configured to modulate light from the light source apparatus depending on an input video signal, the light modulated by the light modulator being projected to a projection surface,
wherein the light source apparatus includes;
a light source; and
a wavelength conversion element,
wherein the wavelength conversion element includes:
a quantum dot layer containing at least one of quantum dots and quantum rods, the quantum dots and rods converting a first light from the light source into a second light whose wavelength is different from that of the first light; and
a fluorescent body layer containing a fluorescent body that converts the first light into a third light whose wavelength is different from that of the first light, and
wherein:
the quantum dot layer and the fluorescent body layer are arranged in this order from a light entrance side on which the first light enters the wavelength conversion element or in reverse order; and
the second light and the third light exit from the quantum dot layer.

* * * * *